US012688453B2

(12) United States Patent
Singh et al.

(10) Patent No.: US 12,688,453 B2
(45) Date of Patent: Jul. 21, 2026

(54) QUBIT STATE MONITORING IN QUANTUM COMPUTERS UTILIZING RADIO FREQUENCY SUPERCONDUCTING QUANTUM INTERFERENCE DEVICES WITH CLASSICAL COMPUTER READOUT AND PROCESSING

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/919,173

(22) Filed: Oct. 17, 2024

(65) Prior Publication Data

US 2026/0111778 A1    Apr. 23, 2026

(51) Int. Cl.
*G06N 10/40* (2022.01)

(52) U.S. Cl.
CPC .................................... *G06N 10/40* (2022.01)

(58) Field of Classification Search
CPC ............................... G06N 10/40; H03K 17/92
USPC ................................................ 327/527, 528
See application file for complete search history.

(56) References Cited

U.S. PATENT DOCUMENTS 6,448,767 B1 * 9/2002 Ganther, Jr. ....... G01R 33/0356
327/527
2018/0026633 A1 * 1/2018 Naaman ................. H03K 17/92
327/528
2021/0065036 A1 * 3/2021 Sank ...................... H10N 60/10
2023/0179175 A1 * 6/2023 Beck .................... H03H 7/0161
327/528
2024/0020562 A1 1/2024 Miano
2025/0158265 A1 5/2025 Strong (Continued)

OTHER PUBLICATIONS

B. D. Josephson, "Possible new effects in superconductive tunnelling," Physics letters, vol. 1, No. 7, pp. 251-253, 1962.

(Continued)

*Primary Examiner* — Tomi Skibinski
(74) *Attorney, Agent, or Firm* — Amin, Turocy & Watson, LLP

(57) ABSTRACT

The technology described herein is directed towards real-time monitoring of qubit states in quantum computers using a system based on rf-SQUIDs (radio-frequency superconducting quantum interference devices) and a direct current signal that is sourced to a superconducting quantum circuit wire, and measured by, a classical computing device. In one implementation, the rf-SQUIDs are positioned at strategic locations, between superconducting quantum circuit wires, in a quantum computer, such as before and after attenuators, and before parametric amplifiers. The direct current control signal facilitates the detection of magnetic flux and inductance without adding load or noise to the superconducting quantum circuit wires, which enhances the detection of qubit state changes. The monitoring and detection system dynamically and precisely monitors qubit state changes and provides real-time feedback to the quantum processing unit to adjust the qubit states, and thereby maintain the integrity of quantum computations.

20 Claims, 13 Drawing Sheets

(56) References Cited

U.S. PATENT DOCUMENTS

2025/0255196 A1* 8/2025 Beck ..................... G06N 10/40

OTHER PUBLICATIONS

P.W. Anderson and J. M. Rowell, "Probable observation of the Josephson superconducting tunneling effect," Physical Review Letters, vol. 10, No. 6, p. 230-232, 1963.

J. Clarke and A. I. Braginski, "The SQUID Handbook: Fundamentals and Technology of SQUIDs and SQUID Systems, vol. I". New York: Wiley-Vch, 2004. 410 pages.

Singh et al. "Distributed Radio Frequency Superconducting Quantum Interference Devices for Qubit State Detection Using a Superconducting Control Wire" U.S. Appl. No. 18/919,218, filed Oct. 17, 2024, 41 pages.

Office Action mailed Mar. 11, 2026 for U.S. Appl. No. 18/919,218, 21 pages.

Notice of Allowance mailed Jun. 8, 2026 for U.S. Appl. No. 18/919,218, 23 pages.

* cited by examiner

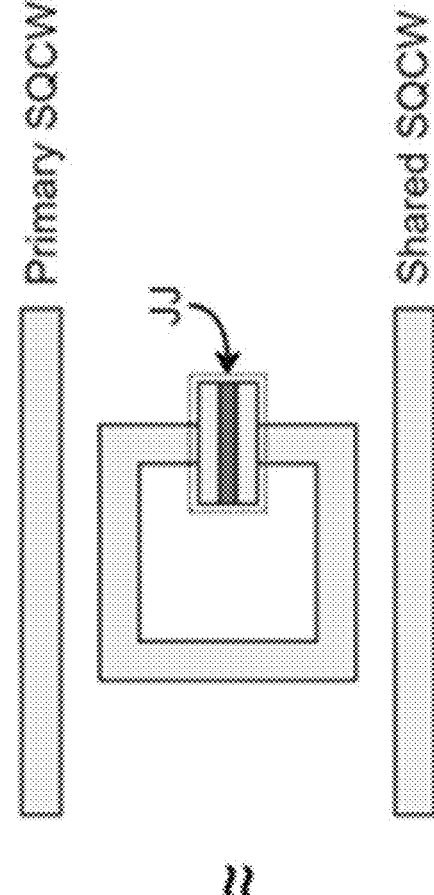
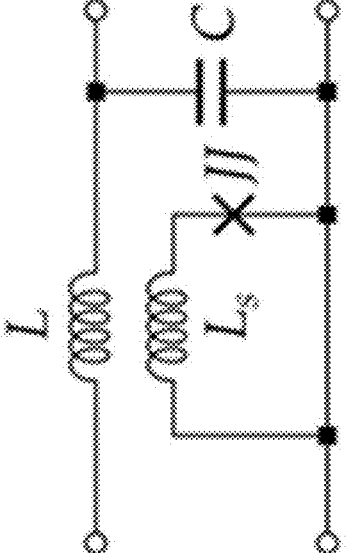
FIG. 6

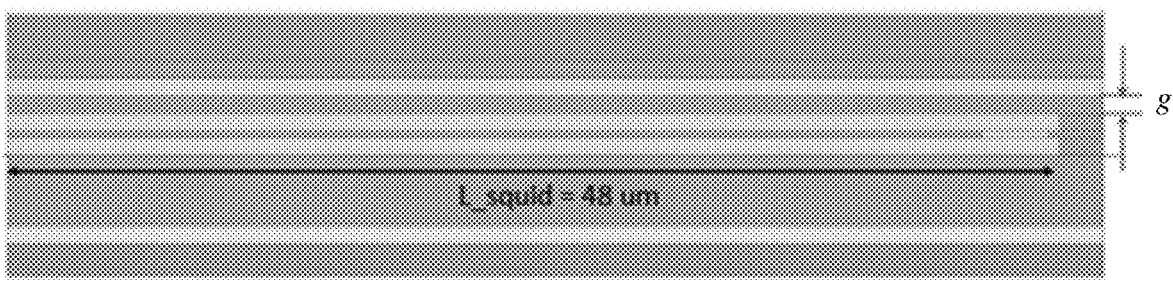
FIG. 10A
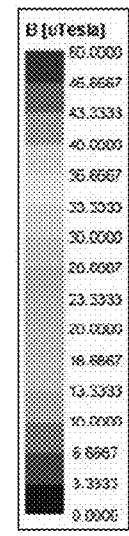
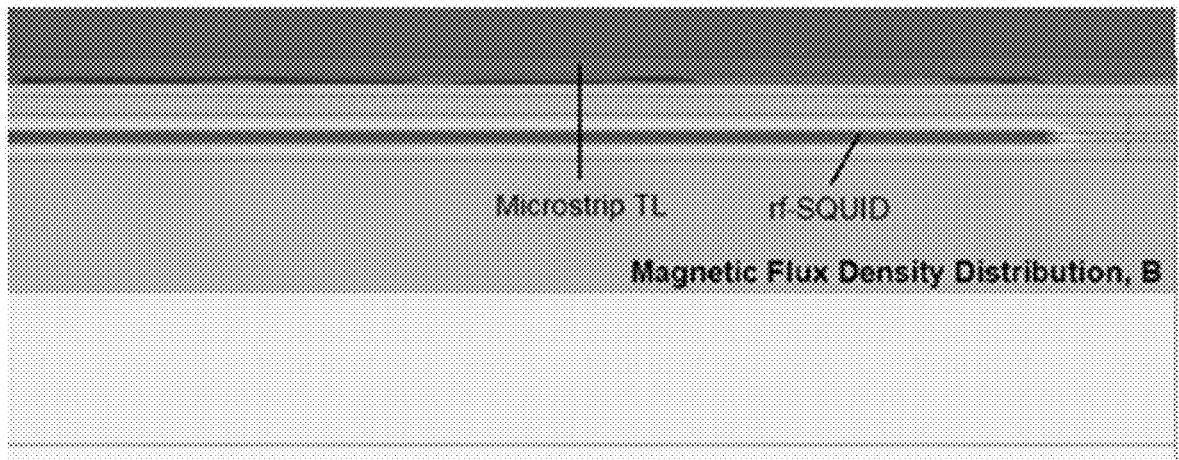
FIG. 10B

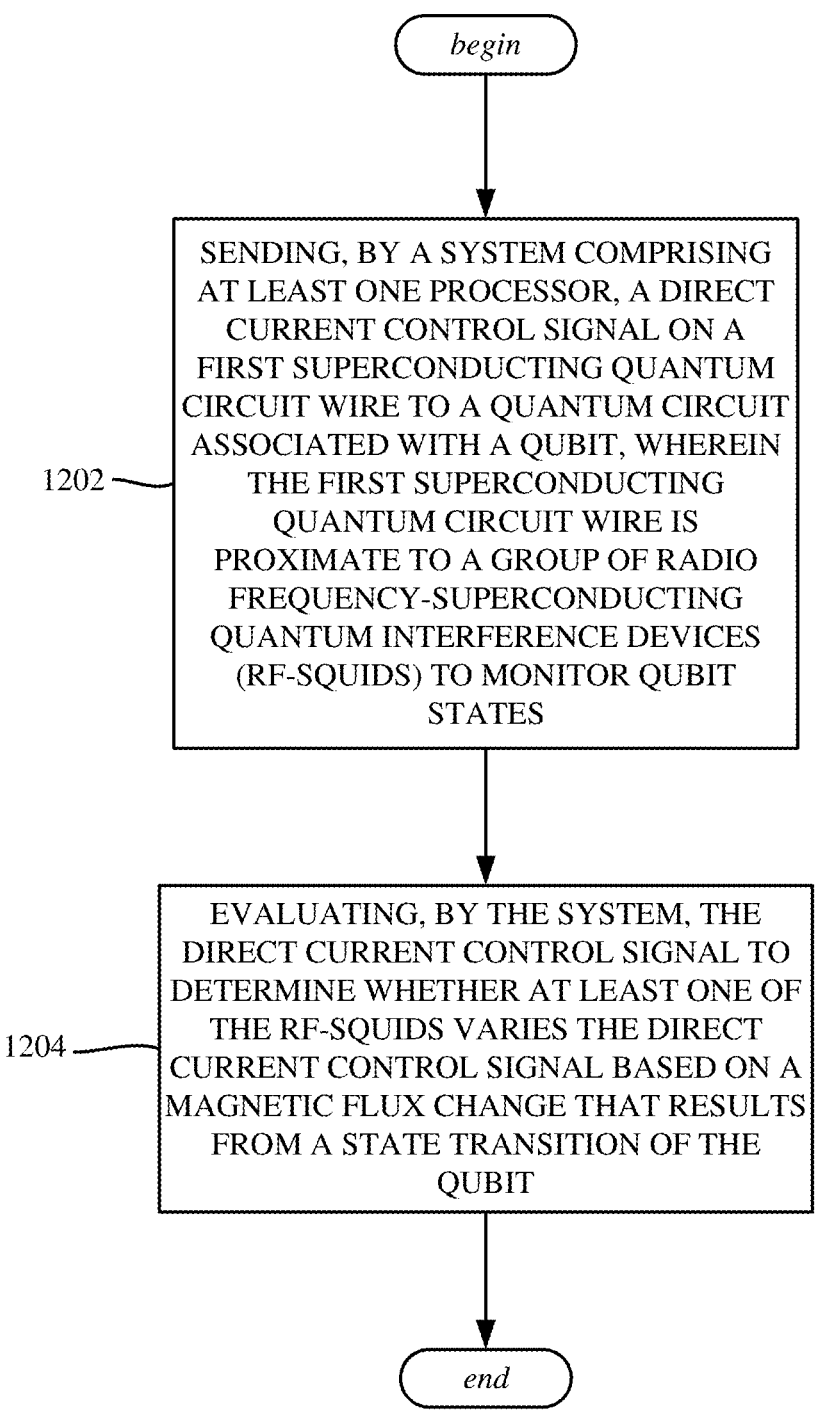

begin

1202 —
SENDING, BY A SYSTEM COMPRISING
AT LEAST ONE PROCESSOR, A DIRECT
CURRENT CONTROL SIGNAL ON A
FIRST SUPERCONDUCTING QUANTUM
CIRCUIT WIRE TO A QUANTUM CIRCUIT
ASSOCIATED WITH A QUBIT, WHEREIN
THE FIRST SUPERCONDUCTING
QUANTUM CIRCUIT WIRE IS
PROXIMATE TO A GROUP OF RADIO
FREQUENCY-SUPERCONDUCTING
QUANTUM INTERFERENCE DEVICES
(RF-SQUIDS) TO MONITOR QUBIT
STATES

1204 —
EVALUATING, BY THE SYSTEM, THE
DIRECT CURRENT CONTROL SIGNAL TO
DETERMINE WHETHER AT LEAST ONE OF
THE RF-SQUIDS VARIES THE DIRECT
CURRENT CONTROL SIGNAL BASED ON A
MAGNETIC FLUX CHANGE THAT RESULTS
FROM A STATE TRANSITION OF THE
QUBIT end

FIG. 12

QUBIT STATE MONITORING IN QUANTUM COMPUTERS UTILIZING RADIO FREQUENCY SUPERCONDUCTING QUANTUM INTERFERENCE DEVICES WITH CLASSICAL COMPUTER READOUT AND PROCESSING

RELATED APPLICATION

The subject patent application is related to U.S. patent application Ser. No. 18/919,218, filed Oct. 17, 2024, and entitled "DISTRIBUTED RADIO FREQUENCY SUPERCONDUCTING QUANTUM INTERFERENCE DEVICES FOR QUBIT STATE DETECTION USING A SUPERCONDUCTING CONTROL WIRE", the entirety of which patent application is hereby incorporated by reference herein.

BACKGROUND

Quantum computing relies on the accurate manipulation and measurement of qubit states. However, qubit states are highly sensitive to external disturbances and noise, leading to potential errors in quantum computations. Traditional methods of qubit state detection have significant challenges, including with respect to detecting ultra-small amounts of magnetic flux resulting from qubit state changes. Current solutions generally lack the sensitivity and real-time capability needed to monitor these minute changes effectively, which results in a failure to promptly detect and correct errors, leading to reduced fidelity and stability in quantum operations.

BRIEF DESCRIPTION OF THE DRAWINGS

The technology described herein is illustrated by way of example and not limited to the accompanying figures in which like reference numerals indicate similar elements and in which:

FIG. 6 is a representation of an example equivalent circuit of a superconducting quantum circuit wire unit-cell containing an rf-SQUID also showing a cross-section view of an rf-SQUID placed between a primary and shared superconducting quantum circuit wire, in accordance with various example embodiments and implementations of the subject disclosure.

FIG. 10A is a cross-sectional view of the example RF-SQUID of FIG. 9B showing one suitable length of the RF-SQUID and the relative gap distance between the superconducting quantum circuit wire and the rf-SQUID, in accordance with various example embodiments and implementations of the subject disclosure.

FIG. 10B is a cross-sectional view showing magnetic flux generation between the superconducting quantum circuit wire and the rf-SQUID, in accordance with various example embodiments and implementations of the subject disclosure.

FIG. 12 is a flow diagram showing example operations related to outputting and inputting an RF signal to detect a qubit state transition, and notifying a quantum circuit of the qubit state transition, in accordance with various example embodiments and implementations of the subject disclosure.

DETAILED DESCRIPTION

Figure 1:
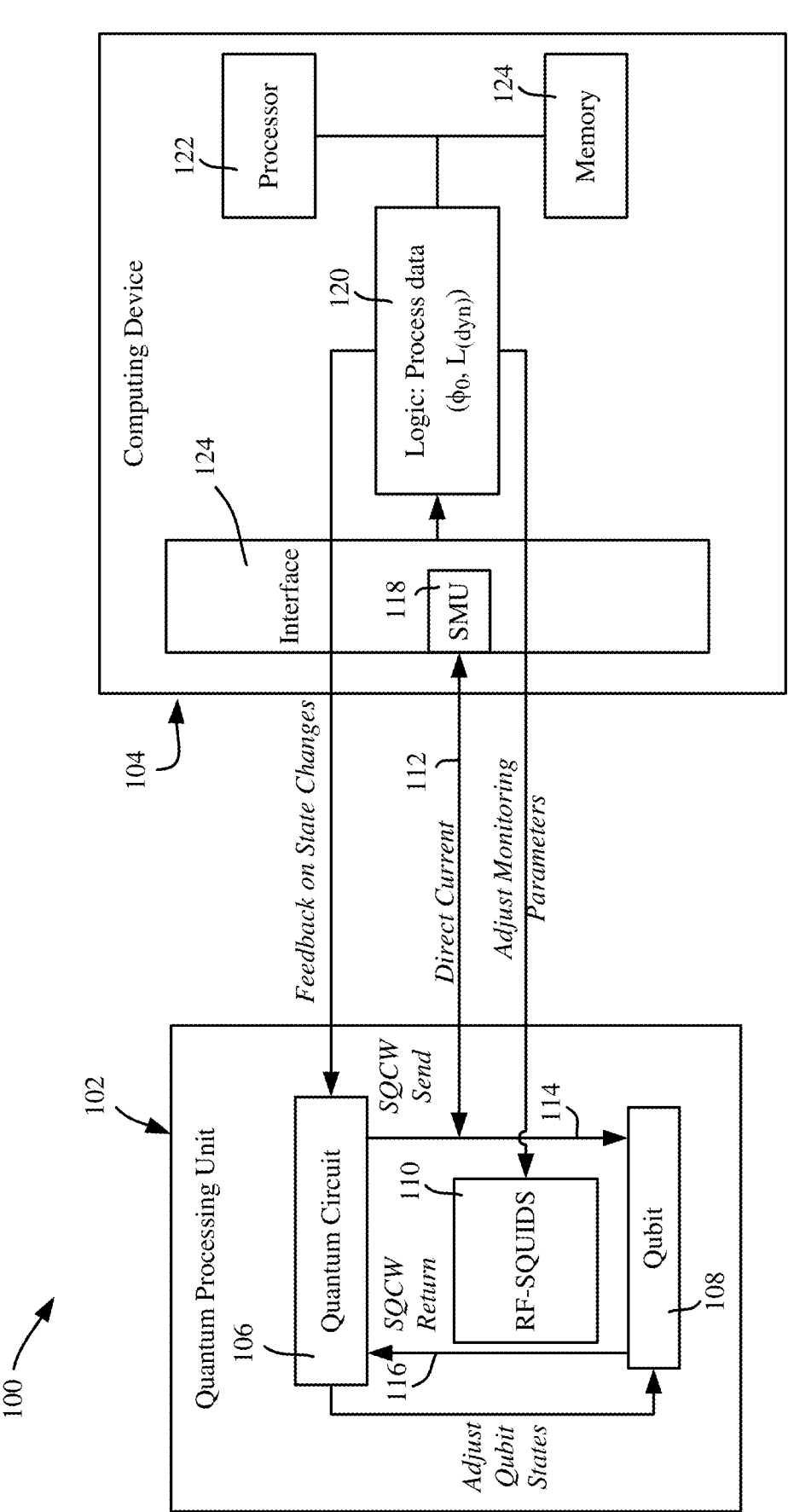
FIG. 1 is a conceptual representation of an example system in which a quantum processing unit device has qubits sensed by radio frequency superconducting quantum interference devices (rf-SQUIDS) coupled to a computing device, in accordance with various example embodiments and implementations of the subject disclosure.

The technology described herein is generally directed towards real-time monitoring of qubit states in quantum computers using rf-SQUIDs (radio-frequency superconducting quantum interference devices) deployed between superconducting quantum circuit wires (SQCWs). In one implementation, the rf-SQUIDs are part of a detection system including a classical computer that, via a sourced and measured direction current control signal coupled to a SQCW, can detect ultra-small magnetic flux changes corresponding to a qubit state change, and provide real-time (virtually immediate) feedback to the quantum processor. Based on the feedback, the quantum processor can adjust the qubit states to maintain the integrity of quantum computations. The technology described herein thus dynamically and precisely monitors qubit state changes, without adding interference.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in quantum computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a representation of an example system 100 including a quantum processing unit 102 coupled to a computing device 104 such as a classical computer (wherein in general, classical computer refers to a commercially available, non-quantum computer system). In general, the quantum processing unit 102 includes a quantum circuit 106 (e.g., quantum gates, qubit state setting and the like) coupled to a qubit 108; (typically a quantum computer has many qubits, although for purposes of explanation herein sensing the state of a single qubit 108 is described).

A number of rf-SQUIDS (collectively labeled 110) are positioned between a superconducting quantum circuit wire (SQCW) 114 corresponding to a send path and a SQCW 116 corresponding to a return path. As described herein, the rf-SQUIDS monitor the states of the qubit 108, and, based on a direct current (DC) control signal applied from the computing device 104, provides monitoring data (e.g., management flux and, inductance) to the computing device 104. The use of a low-power DC control signal aids in detecting qubit state changes without adding load or noise to the SQCW wires 114 or 116. In one implementation, a source-measure unit (SMU) 118 sources and measures the DC control signal.

Logic 120, running via a processor 122 and memory 124 of the computing device 104, processes the monitoring data as described herein to determine whether a qubit state transition occurred. If so, the logic 120 informs the quantum circuit 106 of the state change, providing a feedback loop by which the quantum circuit 106 can adjust the qubit states. Note that a quantum processor can apply specific microwave control pulses to manipulate the state of individual qubits, fine-tuning their quantum properties (e.g., phase, amplitude, and timing) to ensure accurate computations. This mitigates errors caused by environmental noise, resulting in the desired quantum state for the computation by calibrating each qubit's parameters.

In one implementation, an interface 126, such as implemented in a PCIe (peripheral component interconnect express) accelerator card or the like, can perform the read out of the monitoring data, and/or the output of the low-power DC control signal to the wire 112, e.g., via the source-measure unit 118. This facilitates precise, real-time monitoring and feedback for improved system stability and fidelity in quantum operations. Note that some or all of the logic 120 can run on such an accelerator card.

In general, rf-SQUIDs facilitate highly-sensitive magnetic flux detection, capable of detecting changes in magnetic flux as small as a fraction of a flux quantum ($\Phi_0$), typically on the order of 10-6 $\Phi_0$. Such sensitivity enables the detection of very small magnetic flux changes associated with qubit state transitions.

Figure 2:
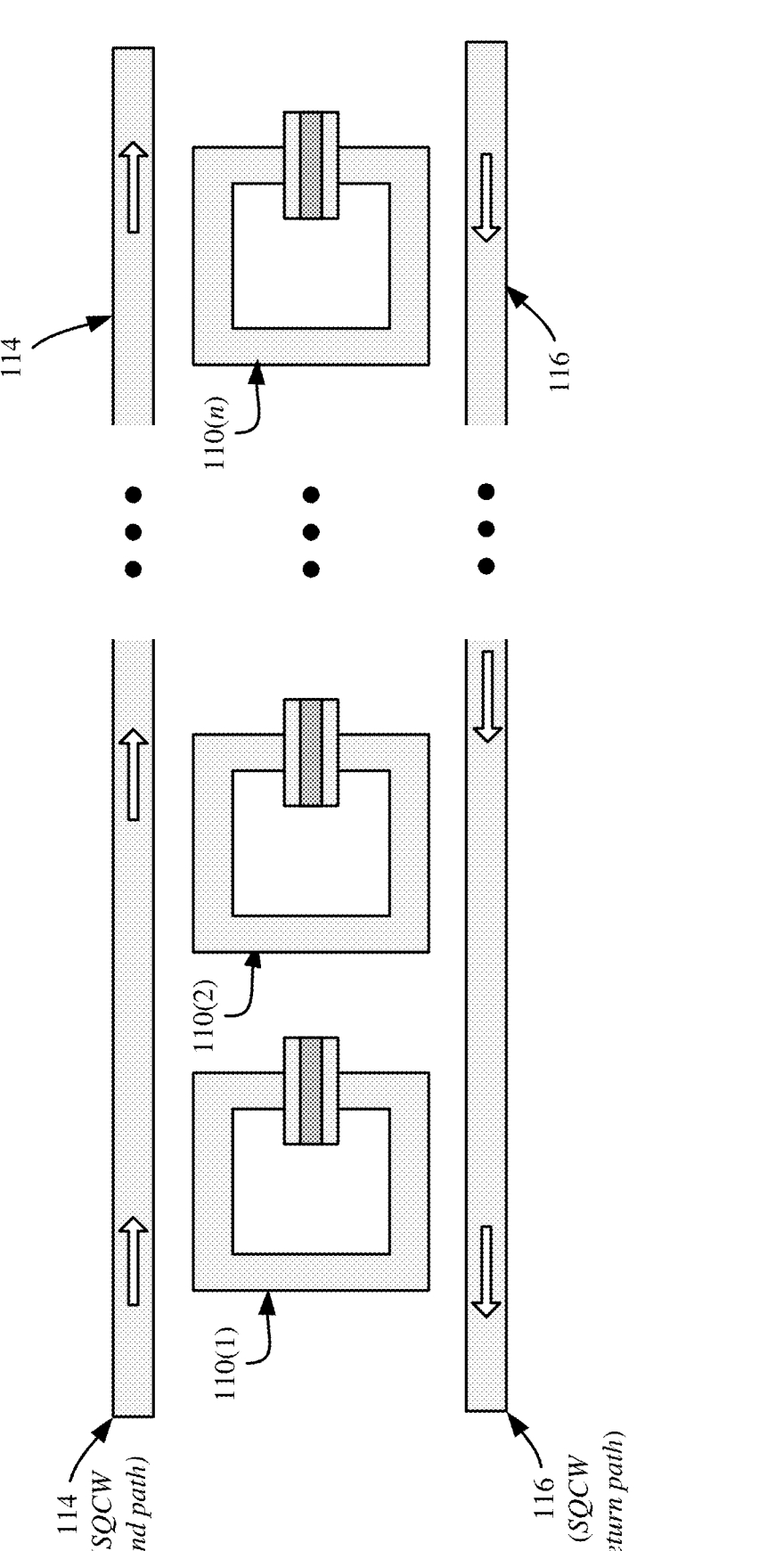
FIG. 2 is cross-sectional view representation showing a number of rf-SQUIDS positioned between superconducting quantum circuit wires, in accordance with various example embodiments and implementations of the subject disclosure.

FIG. 2 shows a cross-section of a group of rf-SQUIDS 110(1)-110(n) aligned between the SQCW 114 and the SQCW 116. The return path can be a shared ground plane for the quantum circuit, or a return path for feedback or simply for qubit return. The control line/detection wire 112 is shown as between the rf-SQUIDS 110(1)-110(n) and the SQCW 116 (return path), although it is feasible to have the control line/detection wire 112 positioned between the rf-SQUIDS 110(1)-110(n) and the SQCW 14 (send path).

Figure 3:
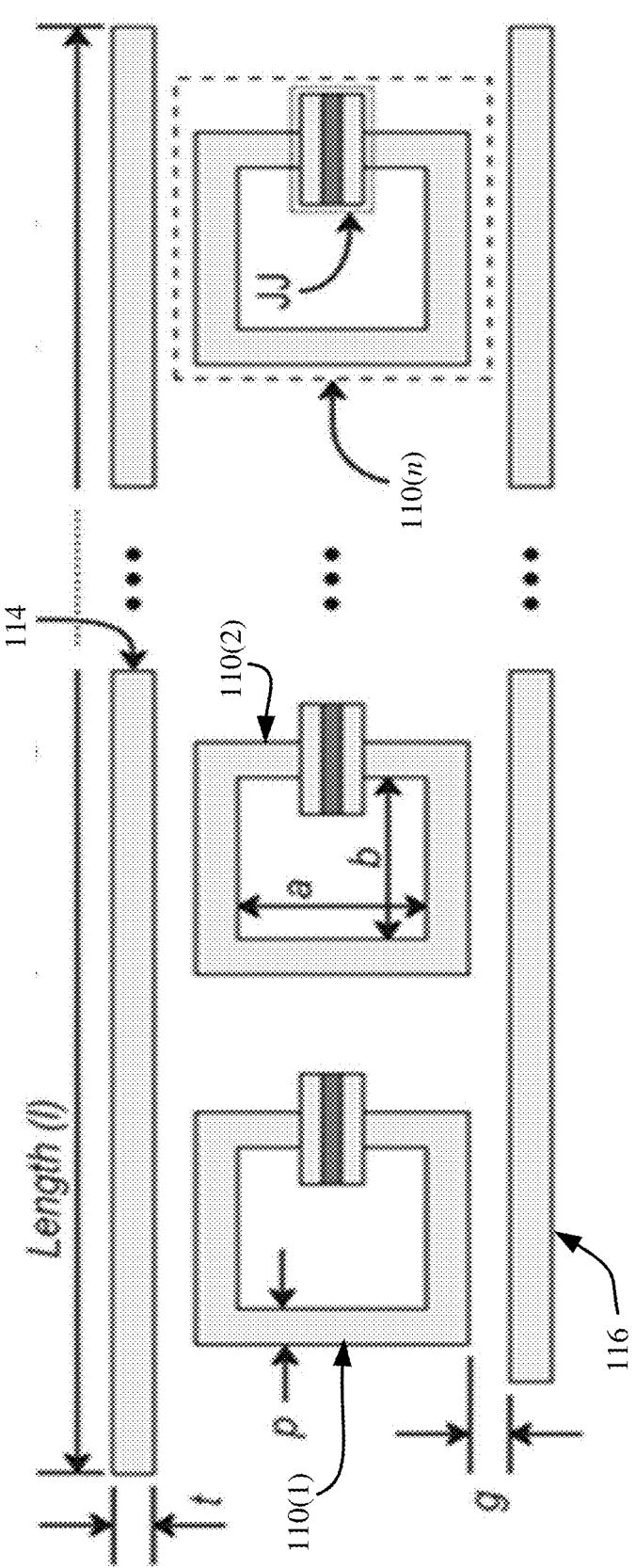
FIG. 3 is a cross-sectional view representation showing various dimensions of the rf-SQUIDS of FIG. 2, in accordance with various example embodiments and implementations of the subject disclosure.

FIG. 3 shows various dimensions for the cross-section of the group of rf-SQUIDS 110(1)-110(n) aligned between the SQCW 114 and the SQCW 116. Note that the label "JJ" in the rf-SQUID 110(n) represents a Josephson junction as described herein.

In one example implementation, the radio frequency (RF) signal, typically between 8-10 GHz for high frequency quantum systems, or less than 1 GHz for low frequency systems, passes through a fixed length (I) of SQCWs 114 and 116, which is magnetically coupled to an array of rf-SQUIDs 110(1)-110(n) along its length as shown in FIG. 3. The rf-SQUIDs 110(1)-110(n) have the loop width (p) and the internal loop length (a) and loop width (b). The rf-SQUIDs 110(1)-110(n) are placed close to the primary SQCW 114 and shared SQCW 116 with a distance/gap (g) with SQCW having the thickness (t).

The rf-SQUIDs 110(1)-110(n) can be placed at key points in a quantum circuit, such as to position the rf-SQUID 110(1) before a splitter section, the rf-SQUID 110(2) near a combiner section, the rf-SQUID 110(3), and up to the rf-SQUID 110(n), can be further placed near the output and before travelling wave parametric amplifier stage. Depending on the circuit topology, a larger number of SQUIDs can be used. In one implementation, a minimum of four rf-SQUIDs are needed to coherently detect the qubit state at different points in the quantum circuit for accurately detecting the change in inductance. Note that a larger number of rf-SQUIDs will provide better accuracy, although at the expense of higher computational load and power requirement from a PCIe card.

In general such a design does not add any interference and does not need any additional compute or signal sources and detectors. The classical computer only needs to output a low-power DC signal on the line 112 and read the signal to monitor for the detection of qubit state changes.

Figure 4:
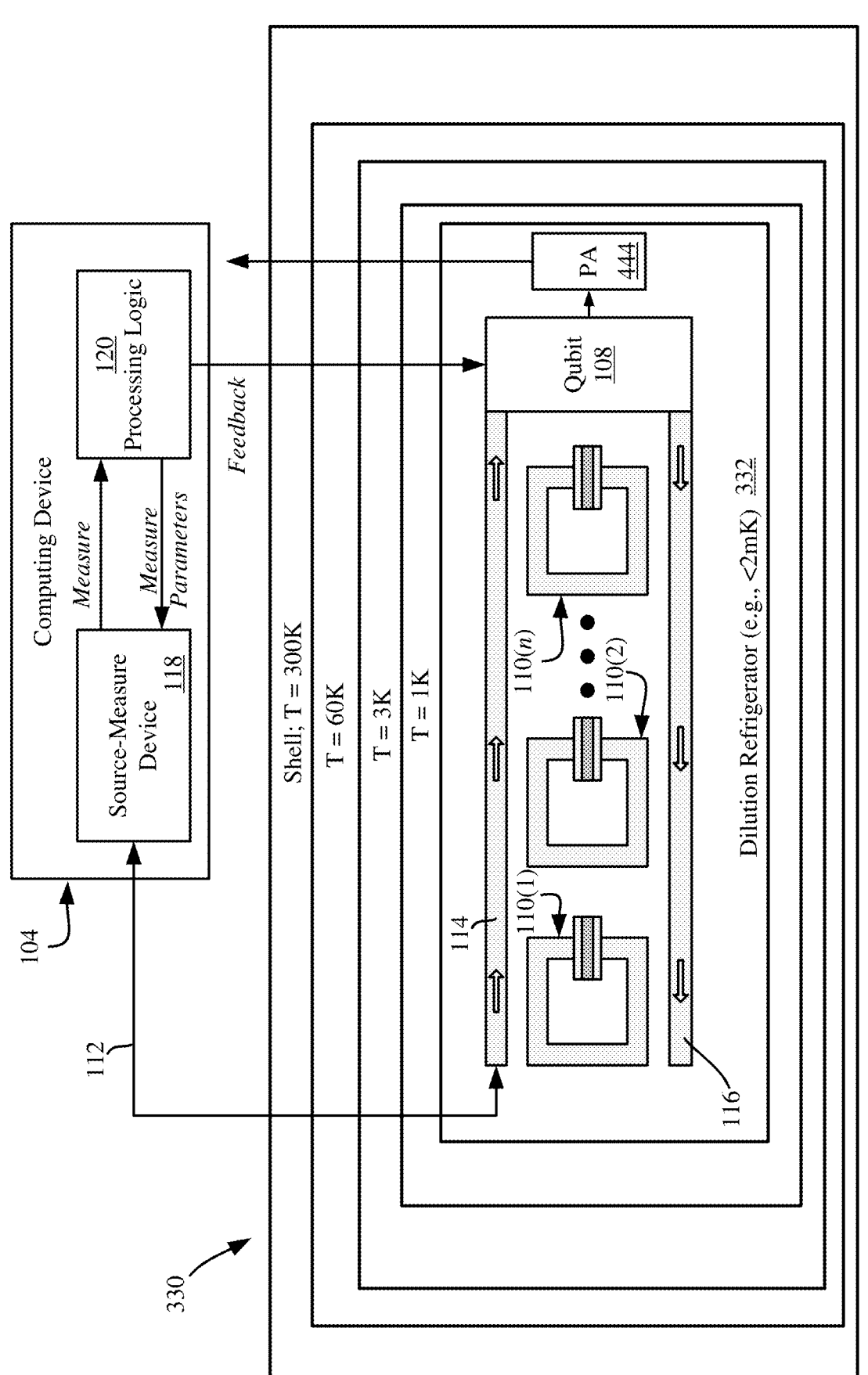
FIG. 4 is a block diagram representation of an example system in which a qubit circuit in a dilution refrigerator is connected via superconducting quantum circuit wires that are sensed by rf-SQUIDS, in accordance with various example embodiments and implementations of the subject disclosure.

FIG. 4 shows the (cross section) group of rf-SQUIDS 110(1)-110(n) in a dilution refrigerator 332 portion of a quantum computer 330 coupled to a computing device 104 as described herein. Example temperatures are shown in degrees Kelvin (K) for various levels of the quantum computer 330, ranging from generally room temperature to milli-Kevins in the dilution refrigerator 332. In this example, the computing device includes a source-measure device 118, e.g., in the PCIe accelerator card, that sources and measures the DC signal on the DC line 112. Also shown in FIG. 4 is a travelling wave parametric amplifier (PA) stage 444, to illustrate how at least one of the rf-SQUIDS 110(1)-110(n) is positioned before that PA stage 444.

To summarize thus far, there is described herein a detection system that operates by utilizing a number of rf-SQUIDs placed at strategic locations along the SQCWs, optimizing the detection of qubit state changes. This facilitates detecting the qubit state without adding any interference or noise to the quantum circuit (e.g., through the DC current from a classical computer). The detection system detects changes in magnetic flux via standard direct current output and readout by a classical computer. In general, the detection system leverages the sensitivity of rf-SQUIDs to detect changes in the magnetic flux and inductance associated with qubit states. The rf-SQUIDs are strategically placed along the superconducting quantum circuit wire (SQCW) to monitor qubit states dynamically, which allows for real-time detection of qubit state changes, providing virtually immediate feedback for error correction.

Magnetic flux through a superconducting loop, such as an rf-SQUID, is quantized in units of the flux quantum $\Phi_0$:

$$\Phi_0 = \frac{h}{2e} \approx 2.07 \times 10^{-15} \text{ Wb}$$

where h is Planck's constant and e is the electron charge. The total magnetic flux $\Phi$ in a superconducting loop can be expressed as:

$$\Phi = n\Phi_0 + LI$$

where n is an integer, L is the inductance of the loop, and I is the current through the loop. The rf-SQUID's ability to detect changes in magnetic flux allows it to monitor the qubit state transitions accurately.

The inductance of the rf-SQUID, $L_s$, changes with the current passing through it. This inductance variation can be represented as:

$$\phi_L = -LI_0 \sin\left(\frac{2\pi\phi_T}{\Phi_0}\right)$$

where $\phi_L$ is the induced flux, $I_0$ is the critical current, and $\phi_T$ is the total flux through the rf-SQUID. This relationship shows how the inductance, and the total flux are interdependent, allowing the rf-SQUID to detect small changes in the qubit state.

The current through the rf-SQUID, $I_s$, is also a function of the total flux and is given by:

$$I_s = -I_0 \sin\left(\frac{2\pi\phi_T}{\Phi_0}\right)$$

This equation highlights how the current in the rf-SQUID varies with the total flux, which can be monitored to detect changes in the qubit state.

The phase shift $\delta$ in the rf-SQUID can be detected using the following relationship:

$$\delta + \frac{2\pi\phi_T}{\Phi_0} = 2\pi n$$

where $\delta$ is the phase shift, $\phi_T$ is the total flux, and n is an integer. This equation is fundamental for detecting changes in phase coherence, which is needed for maintaining qubit stability.

The dynamic inductance $L_{dyn}$ of the rf-SQUID changes with the current passive through it and is given by:

$$L_{dyn} = L_s + \frac{L}{2\pi}\cos\left(\frac{2\pi\phi_T}{\Phi_0}\right)$$

This equation shows how the dynamic inductance varies with the total flux and provides a direct measure of qubit state changes.

The relation between the current and phase in the rf-SQUID is described by:

$$\frac{d\delta}{dt} = \frac{2e\text{V}}{\hbar} = \frac{2\pi\text{V}}{\Phi_0}$$

This relationship shows how phase changes affect the current in the rf-SQUID, which can be used to detect qubit state transitions.

Figure 5:
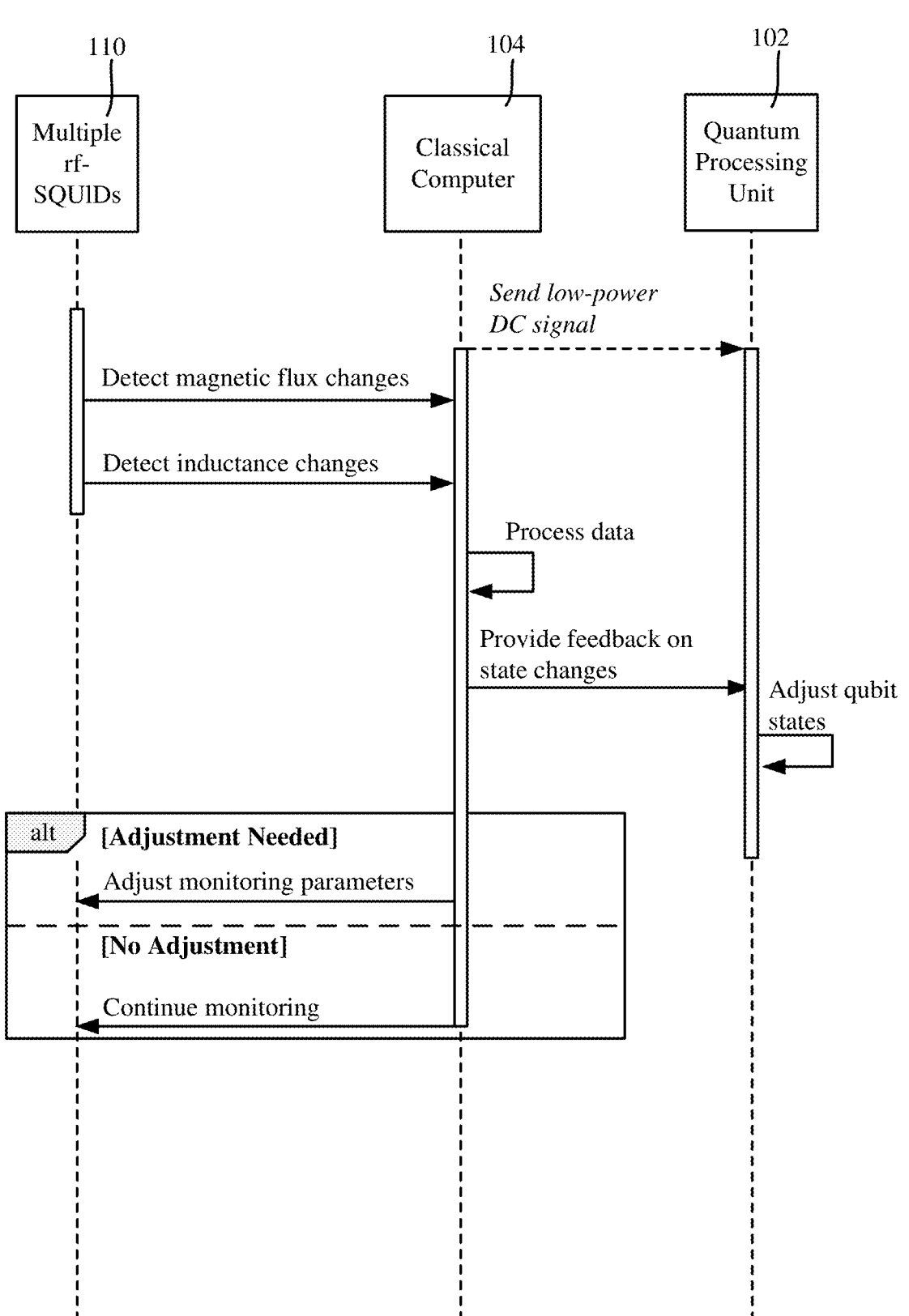
FIG. 5 is a sequence diagram of example component interaction with respect to qubit sensing and feedback from a computing device, in accordance with various example embodiments and implementations of the subject disclosure.

The example sequence diagram shown in FIG. 5 illustrates the interaction between the quantum processing unit 102, multiple rf-SQUIDs 110, and a classical computer 104 for real-time monitoring and adjustment of qubit states. Initially, the qubit states from the quantum circuit 106 are coupled to the rf-SQUIDs 110, enabling them to detect changes in magnetic flux and dynamic inductance. The process begins with the rf-SQUIDs 110 detecting changes in magnetic flux and inductance; note that the classical computer (e.g., via the source-measure unit 118 of the PCIe accelerator card) outputs the DC current as described herein. The magnetic flux and inductance data is then sent to the classical computer 104, which processes it in real-time.

If a state change is detected, the classical computer 104 provides feedback to the quantum processor 102, which adjusts the qubit states as needed. As can be seen, various activation points highlight the periods during which each component is active. The rf-SQUIDs 110 are active during the detection phase, the classical computer 104 is active during data processing and feedback phases, and the quantum processor 120 is active during the qubit adjustment phase. The example sequence diagram of FIG. 5 also includes a continuous monitoring loop, indicating that in general this process repeats continuously to maintain the integrity of the quantum computations.

Such an enhanced qubit state monitoring for hybrid quantum-classical computer system is thus based on deploying multiple rf-SQUIDs at strategic positions across the superconducting quantum circuit wires (SQCW) of the quantum computer, e.g., across significant areas. The enhanced qubit state monitoring technique makes use of the Josephson inductance approach.

Note that in the absence of rf-SQUIDs, the SQCW has a fixed capacitance per unit length (C) and a fixed inductor per unit length (L). The small signal wave velocity of a SQCW is given by:

$$v = 1/\sqrt{(L \cdot C)}$$

As described herein, rf-SQUIDs are placed between the primary SQCW and shared or bottom SQCW. Each rf-SQUID has one Josephson junction (JJ) shunted by an inductive superconductive loop. A Josephson junction (JJ) is a fundamental component in superconducting quantum circuits, made from two superconductors separated by a thin insulating barrier. When a current flows through the junction, the current can tunnel through the insulator without any voltage drop, a phenomenon known as the Josephson effect. An rf-SQUID (as well as a dc-SQUID, not described herein), combines the physical phenomenon of flux quantization and Josephson tunneling.

The length of the line containing one SQUID is much shorter than the RF wavelength. Each rf-SQUID is a superconducting loop extending on two metal layers shunted by interconnects on one end and JJ on the other end as shown in the right portion FIG. 6. The equivalent circuit of a SQCW section coupled to a rf-SQUID is shown in the left portion of FIG. 6.

When a DC control current $I_{dc}$ is passed through the SQCW, flux is linked to the SQUID loop, because it is magnetically coupled to the SQCW. This linked flux results in a change in the phase of the SQUID, thereby altering the dynamic inductance of the transmission line that is used for detecting and monitoring the qubit state. The output current can be controlled using a classical computer with a PCIe based accelerator card that can provide digital-to-analog conversion for DC current detection and source.

Figure 7:
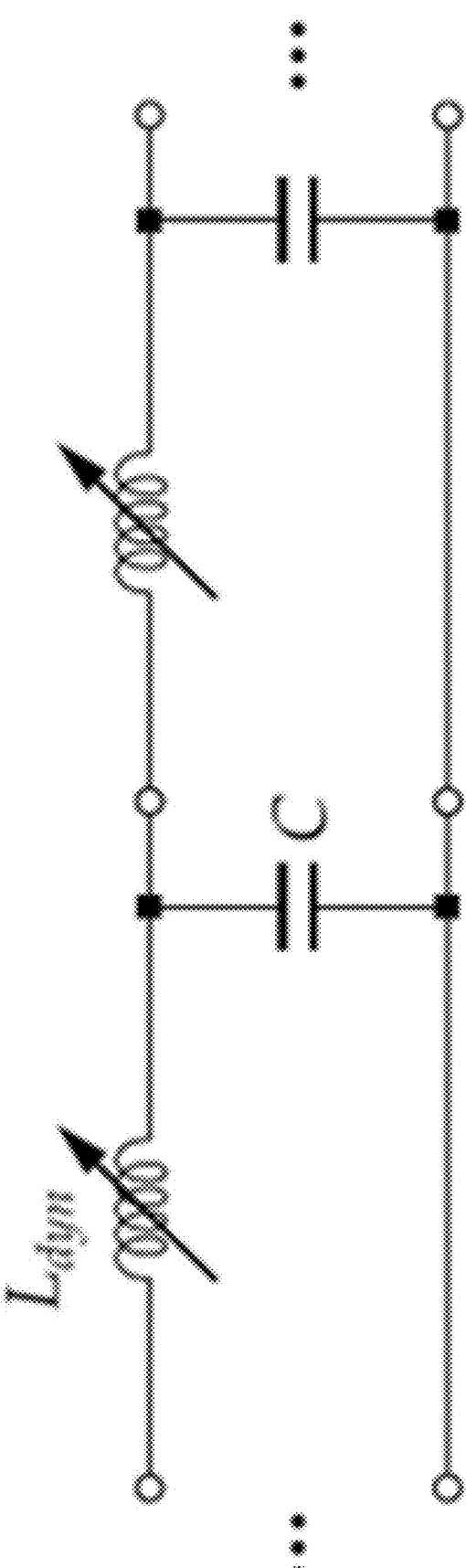
FIG. 7 is a representation of an example lumped element model of a qubit state detector circuit with two unit-cell equivalents depicted, in accordance with various example embodiments and implementations of the subject disclosure.
Figure 8:
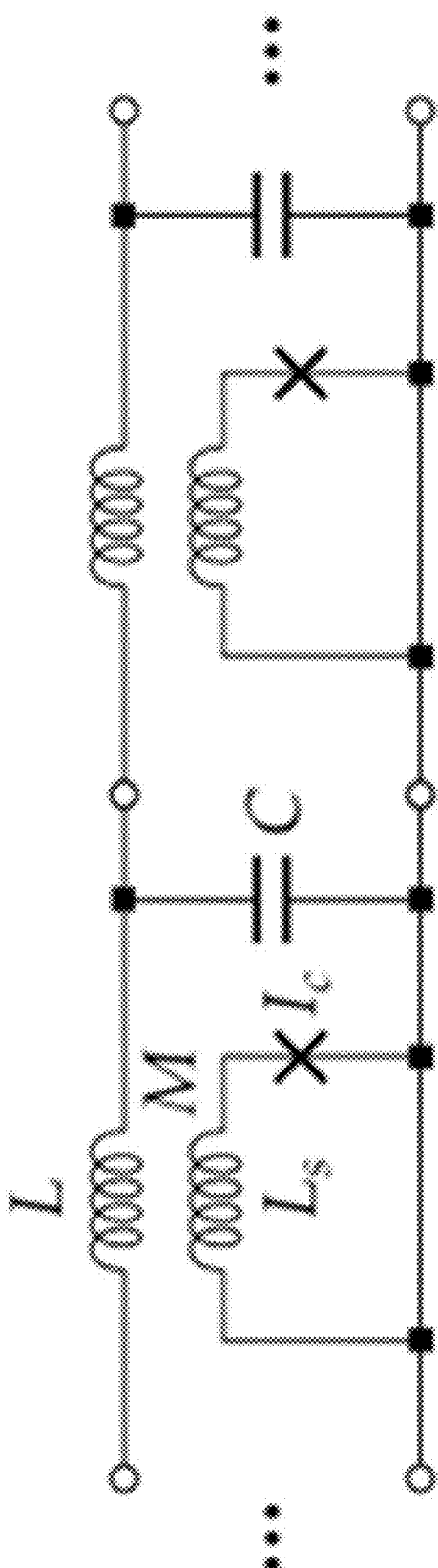
FIG. 8 is an example top view representation of an example small signal RF equivalent circuit for qubit state detection, in accordance with various example embodiments and implementations of the subject disclosure.

The magnetic coupling of the SQCW to an array of rf-SQUIDs leads to a dynamic inductance per unit length ($L_{dyn}$) as shown in FIG. 7. A small signal RF equivalent circuit of the quantum state detection portion of the qubit state monitoring and detection system is shown in FIG. 8. As a result, coupling a number of rf-SQUIDs to a SQCW creates a variable magnetic medium in which wave velocity can be controlled electronically, $$v = 1/\sqrt{(L_{dyn} \cdot C)}.$$

Figure 9A:
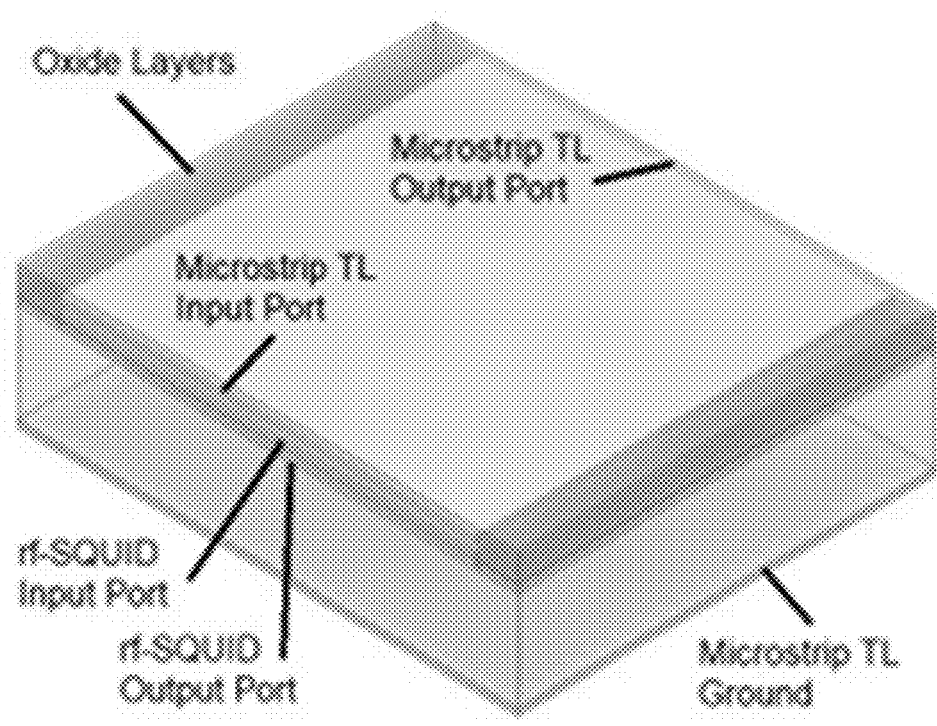
FIG. 9A is a three-dimensional view of an example RF-SQUID used in simulation measurements, in accordance with various example embodiments and implementations of the subject disclosure.
Figure 9B:
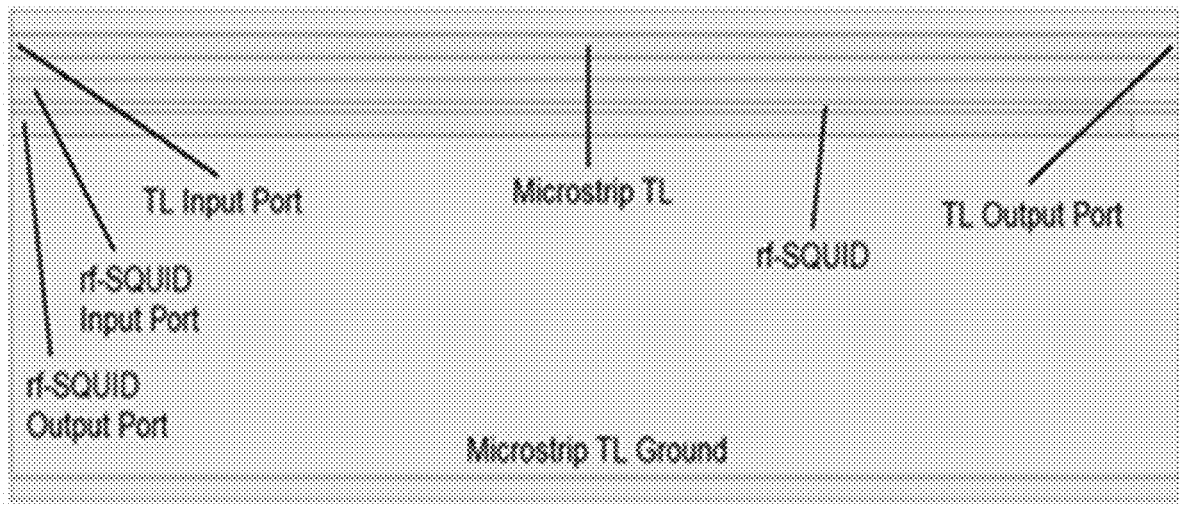
FIG. 9B is a cross-sectional view of the example RF-SQUID of FIG. 9A, in accordance with various example embodiments and implementations of the subject disclosure.

An rf-SQUID model was designed in ANSYS MAXWELL to simulate the magnetic flux change and equivalent dynamic inductance change to prove the concept. FIG. 9A shows a 3D view of the rf-SQUID designed for simulation. The cross-section view of the rf-SQUID is depicted in FIG. 9B. FIG. 10A shows a close-up view highlighting the gap distance g between the SQCW and an rf-SQUID, and the total length L_squid (48 µm) of the rf-SQUID loop used for simulation.

Simulations were carried out in the industry standard ANSYS MAXWELL software to capture the magnetic flux with applied DC power. The simulator solved the partial differential equations and Maxwell equations to compute the electric and magnetic fields, including magnetic flux, and a finite element solver. The simulations were carried out using tetrahedral mesh. The change in the magnetic flux with applied current is shown in FIG. 10B.

Figure 11A:
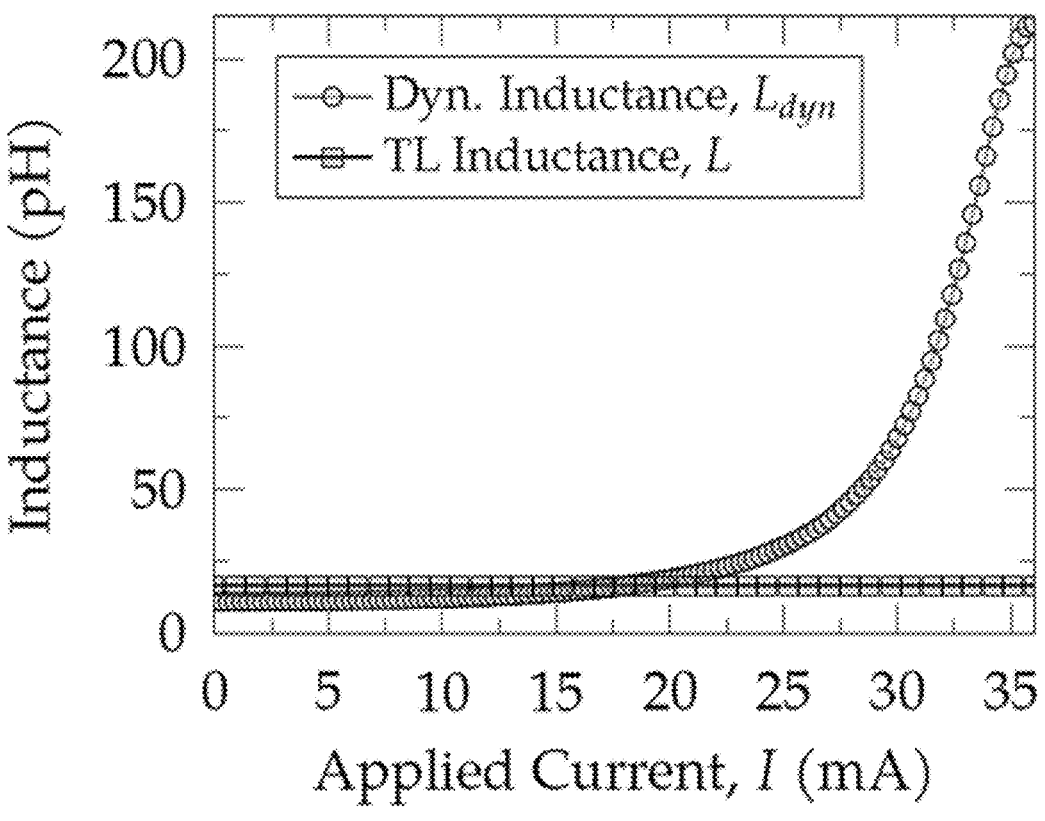
FIG. 11A is a graphical representation of example simulation results highlighting sensed change in inductance with applied RF power to the control line, in accordance with various example embodiments and implementations of the subject disclosure.
Figure 11B:
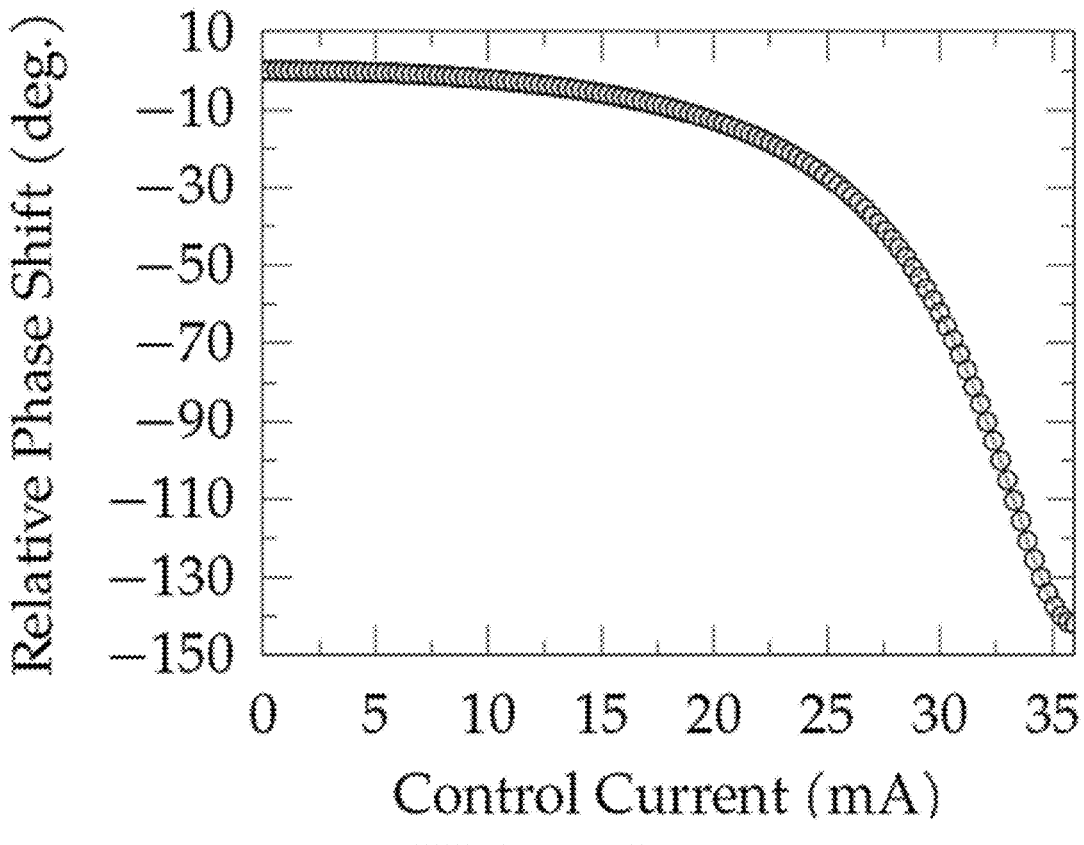
FIG. 11B is a graphical representation of example simulation results highlighting sensed change in relative phase shift change with applied RF power to the control line, in accordance with various example embodiments and implementations of the subject disclosure.

The dynamic inductance change with change in RF power is shown in FIG. 11A. Respective relative phase shift response is simulated as illustrated in FIG. 11B.

One or more implementations and embodiments can be embodied in a system, such as described and represented in the examples herein. The system can include a group of radio frequency-superconducting quantum interference devices (rf-SQUIDs) positioned between a first superconducting quantum circuit wire corresponding to a send path to a quantum circuit, and a second superconducting quantum circuit wire corresponding to a return path from the quantum circuit. The group of rf-SQUIDs is configured to monitor magnetic flux corresponding to a state of a qubit of the quantum circuit, and the group of rf-SQUIDs is configured to monitor an inductance corresponding to the state of the qubit of the quantum circuit. The system can include a computing device coupled to the first superconducting quantum circuit wire and the second superconducting quantum circuit wire, in which the computing device is configured to source direct current to the first superconducting quantum circuit wire, and to measure the direct current to determine whether the direct current is varied by a magnetic flux change that results from a state transition of the qubit.

The computing device can determine that the direct current was varied based on a state transition of the qubit, and the computing device can communicate feedback data corresponding to the state transition of the qubit to a quantum processor for state adjustment of the qubit.

The computing device can include a source measure unit configured to source the direct current and to measure the direct current. The source measure unit can be integrated into a peripheral component interconnect express card that is incorporated into the computing device.

The direct current can be first direct current sourced at a first level, and the computing device can adjust the first direct current at the first level to a second direct current at a second level a sourced from the computing device based on a measurement of the first direct current at the first level.

The group of rf-SQUIDs can include at least four rf-SQUIDs.

The group of rf-SQUIDs can include an rf-SQUID positioned proximate to a coupler of a quantum computer associated with the quantum circuit.

The group of rf-SQUIDs can include an rf-SQUID positioned proximate to a splitter section of a quantum computer associated with the quantum circuit.

The group of rf-SQUIDs can include an rf-SQUID positioned proximate to a combiner section of a quantum computer associated with the quantum circuit.

An attenuator can be coupled to the first superconducting quantum circuit wire, and the group of rf-SQUIDs can include an rf-SQUID positioned before the attenuator with respect to a direction of the send path.

An attenuator can be coupled to the first superconducting quantum circuit wire, and the group of rf-SQUIDs can include an rf-SQUID positioned after the attenuator with respect to a direction of the send path.

A traveling wave parametric amplifier can be coupled to the first superconducting quantum circuit wire, and the group of rf-SQUIDs can include an rf-SQUID positioned before the traveling wave parametric amplifier with respect to a direction of the send path.

One or more example implementations and embodiments, such as corresponding to example operations of a method, can be represented in FIG. 12. Example operation 1202 represents sending, by a system comprising at least one processor, a direct current control signal on a first superconducting quantum circuit wire to a quantum circuit associated with a qubit, wherein the first superconducting quantum circuit wire is proximate to a group of radio frequency-superconducting quantum interference devices (rf-SQUIDs) to monitor qubit states. Example operation 1204 represents evaluating, by the system, the direct current control signal to determine whether at least one of the rf-SQUIDS varies the direct current control signal based on a magnetic flux change that results from a state transition of the qubit.

Further operations can include determining, by the system based on the evaluating of the direct current control signal, a state transition of the qubit, and communicating, by the system, information corresponding to the state transition of the qubit, to a quantum processor associated with the quantum circuit for adjustment of a state of the qubit.

Further operations can include adjusting, by the system, a current level of the direct current control signal to change a monitoring parameter of the group of rf-SQUIDs.

Further operations can include adjusting, by the system, a current level of the direct current control signal to change an inductance of the group of rf-SQUIDs.

Further operations can include adjusting, by the system, a current level of the direct current control signal to change relative phase shift response data of the group of rf-SQUIDs.

Figure 13:
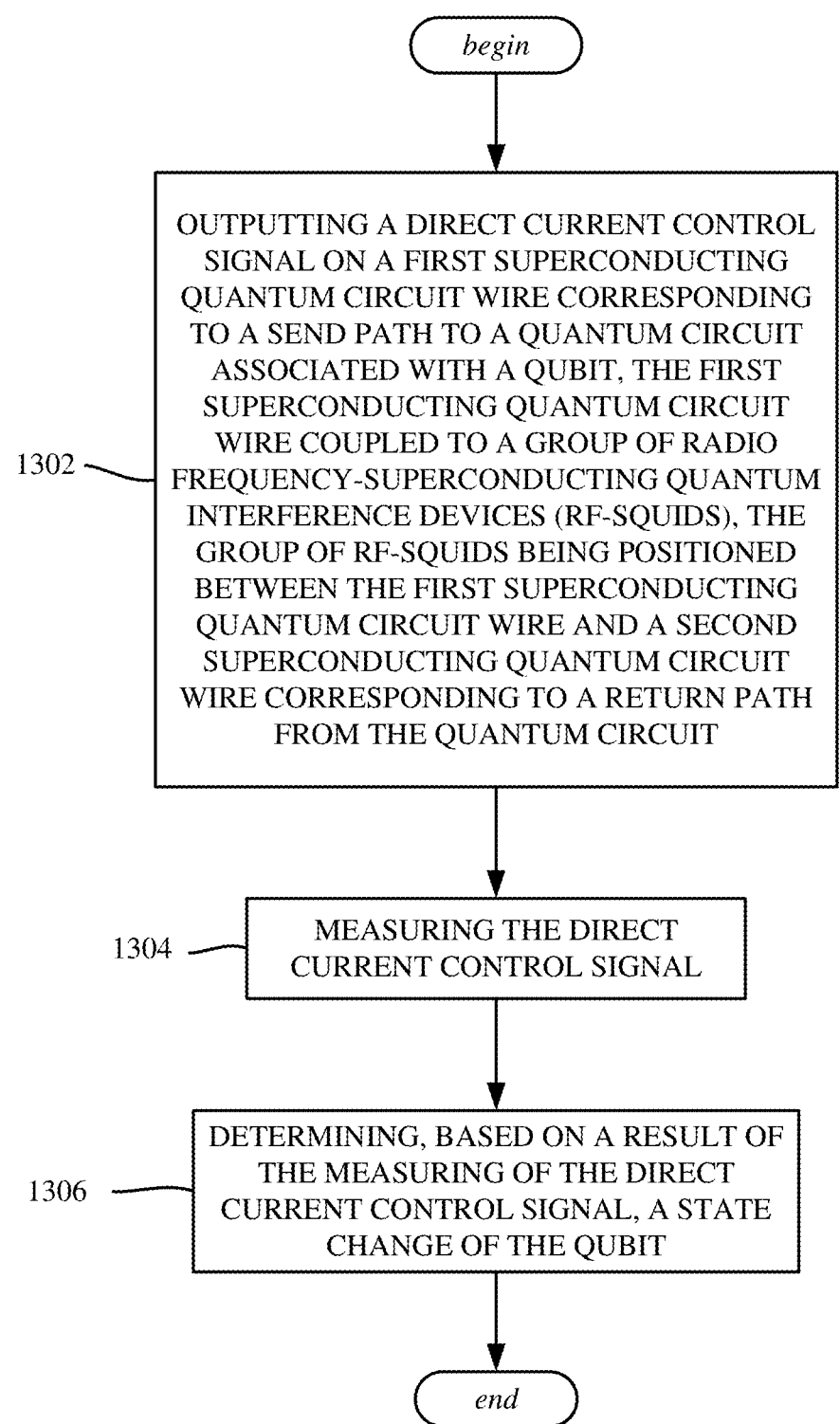
FIG. 13 is a flow diagram showing example operations related to sending a direct current control signal on superconducting quantum circuit wire to evaluate a qubit for a state transition, in accordance with various example embodiments and implementations of the subject disclosure.

FIG. 13 summarizes various example operations, e.g., corresponding to a machine-readable medium, including executable instructions that, when executed by at least one processor, facilitate performance of operations. Example operation 1302 represents outputting a direct current control signal on a first superconducting quantum circuit wire corresponding to a send path to a quantum circuit associated with a qubit, the first superconducting quantum circuit wire coupled to a group of radio frequency-superconducting quantum interference devices (rf-SQUIDs), the group of rf-SQUIDs being positioned between the first superconducting quantum circuit wire and a second superconducting quantum circuit wire corresponding to a return path from the quantum circuit. Example operation 1304 represents measuring the direct current control signal. Example operation 1306 represents determining, based on a result of the measuring of the direct current control signal, a state change of the qubit.

Further operations can include communicating information corresponding to the state change to a quantum processor associated with the quantum circuit for adjustment of a state of the qubit.

Further operations can include adjusting the current level of the direct current control signal from a first current level to a second current level based on the result of the measuring of the direct current control signal.

As can be seen, the technology described herein facilitates enhanced accuracy and reliability in monitoring qubit states in quantum computers. By leveraging the sensitivity of rf-SQUIDs, capable of detecting changes in magnetic flux as small as $10^{-6} \, \Phi_0$, the system provides significant precision in capturing minute qubit state transitions. Such ultra-sensitive detection capability ensures that even very small changes in the qubit states are detected and corrected in real-time, significantly reducing errors in quantum computations. Furthermore, the integration of a classical computer equipped with a PCIe accelerator card enables fast and efficient data processing, allowing for immediate feedback and dynamic adjustments to maintain qubit fidelity and stability. This real-time monitoring and feedback loop ensures high-performance quantum operations, thereby enhancing the overall robustness and reliability of quantum computing systems.

The viability of this approach is reinforced by the strategic placement of a minimal number of rf-SQUIDs, optimizing resource usage while maintaining high detection efficiency. The use of a classical computer with a PCIe accelerator card for data processing ensures that the system can handle the computational demands of real-time monitoring without significant latency. Note that copper connectors can limit ultra-fast read-out speeds, however scheduled advancements in interconnect technology will further increase the read-out speeds. Given the scalability of the technology described herein its alignment with existing quantum computing infrastructure, the system is highly practical and can be readily integrated into current and future quantum computing systems. The combination of precise qubit state detection, real-time feedback, and efficient resource utilization makes this approach a practical and valuable enhancement to the field of quantum computing.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a group of radio frequency-superconducting quantum interference devices (rf-SQUIDs) positioned between a first superconducting quantum circuit wire corresponding to a send path to a quantum circuit, and a second superconducting quantum circuit wire corresponding to a return path from the quantum circuit,
wherein the group of rf-SQUIDs is configured to monitor magnetic flux corresponding to a state of a qubit of the quantum circuit,
wherein the group of rf-SQUIDs is configured to monitor an inductance corresponding to the state of the qubit of the quantum circuit; and
a computing device coupled to the first superconducting quantum circuit wire and the second superconducting quantum circuit wire, the computing device configured to source direct current to the first superconducting quantum circuit wire, and to measure the direct current to determine whether the direct current is varied by a magnetic flux change that results from a state transition of the qubit.

2. The system of claim 1, wherein the computing device determines that the direct current was varied based on a state transition of the qubit, and wherein the computing device communicates feedback data corresponding to the state transition of the qubit to a quantum processor for state adjustment of the qubit.

3. The system of claim 1, wherein the computing device comprises a source measure unit configured to source the direct current and to measure the direct current.

4. The system of claim 3, wherein the source measure unit is integrated into a peripheral component interconnect express card that is incorporated into the computing device.

5. The system of claim 1, wherein the direct current is first direct current sourced at a first level, and wherein the computing device adjusts the first direct current at the first level to a second direct current at a second level a sourced from the computing device based on a measurement of the first direct current at the first level.

6. The system of claim 1, wherein the group of rf-SQUIDs comprises at least four rf-SQUIDs.

7. The system of claim 1, wherein the group of rf-SQUIDs comprises an rf-SQUID positioned proximate to a coupler of a quantum computer associated with the quantum circuit.

8. The system of claim 1, wherein the group of rf-SQUIDs comprises an rf-SQUID positioned proximate to a splitter section of a quantum computer associated with the quantum circuit.

9. The system of claim 1, wherein the group of rf-SQUIDs comprises an rf-SQUID positioned proximate to a combiner section of a quantum computer associated with the quantum circuit.

10. The system of claim 1, wherein an attenuator is coupled to the first superconducting quantum circuit wire, and wherein the group of rf-SQUIDs comprises an rf-SQUID positioned before the attenuator with respect to a direction of the send path.

11. The system of claim 1, wherein an attenuator is coupled to the first superconducting quantum circuit wire, and wherein the group of rf-SQUIDs comprises an rf-SQUID positioned after the attenuator with respect to a direction of the send path.

12. The system of claim 1, wherein a traveling wave parametric amplifier is coupled to the first superconducting quantum circuit wire, and wherein the group of rf-SQUIDs comprises an rf-SQUID positioned before the traveling wave parametric amplifier with respect to a direction of the send path.

13. A method, comprising:
sending, by a system comprising at least one processor, a direct current control signal on a first superconducting quantum circuit wire to a quantum circuit associated with a qubit, wherein the first superconducting quantum circuit wire is proximate to a group of radio frequency-superconducting quantum interference devices (rf-SQUIDs) to monitor qubit states; and evaluating, by the system, the direct current control signal to determine whether at least one of the rf-SQUIDS varies the direct current control signal based on a magnetic flux change that results from a state transition of the qubit.

14. The method of claim 13, further comprising determining, by the system based on the evaluating of the direct current control signal, a state transition of the qubit, and communicating, by the system, information corresponding to the state transition of the qubit, to a quantum processor associated with the quantum circuit for adjustment of a state of the qubit.

15. The method of claim 13, further comprising adjusting, by the system, a current level of the direct current control signal to change a monitoring parameter of the group of rf-SQUIDs.

16. The method of claim 13, further comprising adjusting, by the system, a current level of the direct current control signal to change an inductance of the group of rf-SQUIDs.

17. The method of claim 13, further comprising adjusting, by the system, a current level of the direct current control signal to change relative phase shift response data of the group of rf-SQUIDs.

18. A non-transitory machine-readable medium, comprising executable instructions that, when executed by at least one processor, facilitate performance of operations, the operations comprising:

outputting a direct current control signal on a first superconducting quantum circuit wire corresponding to a send path to a quantum circuit associated with a qubit, the first superconducting quantum circuit wire coupled to a group of radio frequency-superconducting quantum interference devices (rf-SQUIDs), the group of rf-SQUIDs being positioned between the first superconducting quantum circuit wire and a second superconducting quantum circuit wire corresponding to a return path from the quantum circuit;

measuring the direct current control signal; and determining, based on a result of the measuring of the direct current control signal, a state change of the qubit.

19. The non-transitory machine-readable medium of claim 18, wherein the operations further comprise communicating information corresponding to the state change to a quantum processor associated with the quantum circuit for adjustment of a state of the qubit.

20. The non-transitory machine-readable medium of claim 18, wherein the operations further comprise adjusting the current level of the direct current control signal from a first current level to a second current level based on the result of the measuring of the direct current control signal.

* * * * *